Nov. 9, 1965  J. HALSIG  3,216,374
AUTOMATIC PASTRY DOUGH PROCESSING DEVICE
Filed April 18, 1962  2 Sheets-Sheet 1

INVENTOR.
JOSEF HALSIG
BY Weiss & Hemminger
ATTORNEYS

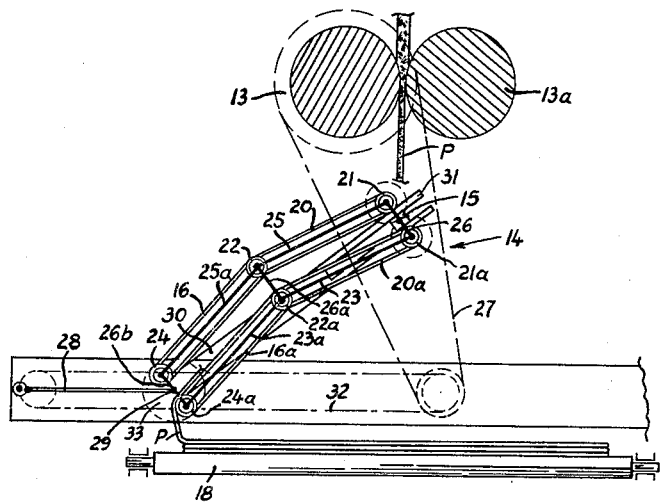
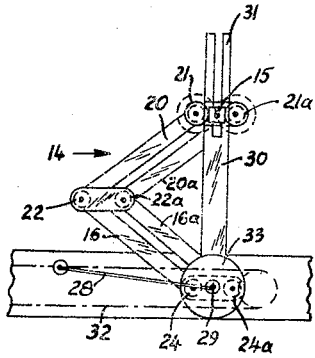
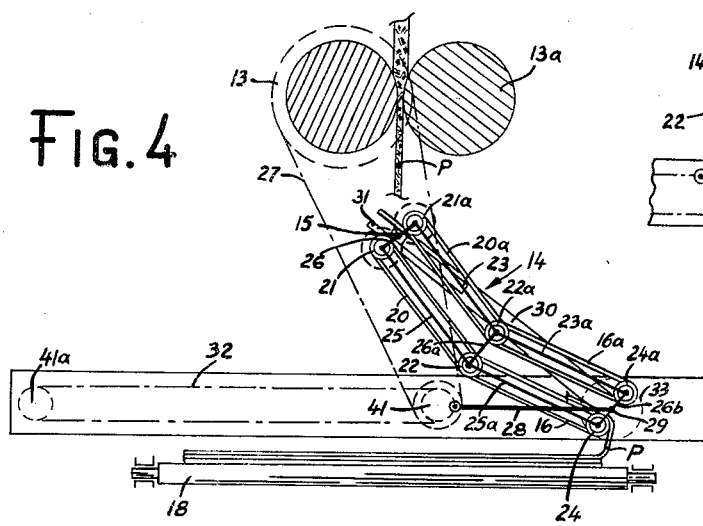
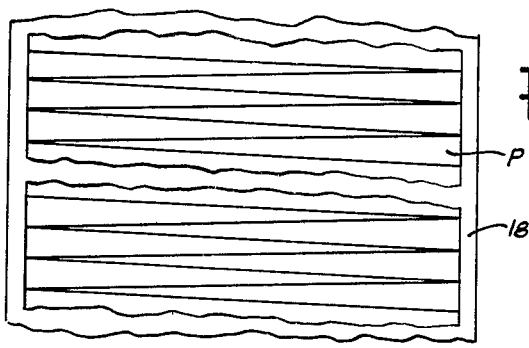

United States Patent Office 3,216,374
Patented Nov. 9, 1965

3,216,374
AUTOMATIC PASTRY DOUGH PROCESSING
DEVICE
Josef Halsig, St. Toenis, near Krefeld, Germany, assignor to Maschinenfabrik Briem-Hengler & Cronemeyer K.G., Krefeld, Germany
Filed Apr. 18, 1962, Ser. No. 188,451
4 Claims. (Cl. 107—1)

This invention relates in general to automatic pastry dough processing devices and in particular to devices for rolling and shaping a mass of dough into a continuous length of multi-layer dough having any desired type of filling enclosed therein.

In known pastry dough processing devices for forming a multi-layer pastry product, a strip or band of dough is formed, the desired type of filling is placed on this strip and then a second strip or band of dough is formed and placed over the first dough strip and filling. Thereafter, the two strips of dough and interspersed filling are passed through a set of rollers which press the edges of the two strips of dough together, sealing the filling therebetween. Special apparatus transfers the multi-layer pastry product, to a conveyer belt for further operations such as cutting and baking. This known device requires separate conveyer areas for each strip and for applying the filling to the first strip and thus requires a large floor area. Additionally, since the known device covers a large area, several operators or attendants are necessary to supply and supervise the various sections of the device.

It is an object of this invention to provide automatic pastry dough processing devices in which the formation of multi-layer strips of pastry dough and the insertion of a filling therebetween is carried out in the same section of the device, thereby reducing the space requirements for housing such device.

Another object is to provide automatic pastry dough processing devices in which the dough and filling supply to each of the layer forming sections are controlled from a common area to permit a single attendant to expeditiously control the supply of pastry dough to the device.

A feature related to the above object resides in the arrangement wherein conveyers extend between the noted common area and the dough and filling supply inputs.

Still another object is to provide automatic pastry dough processing devices having new and improved dough transferring apparatus for placing the multi-layer pastry product transversely on a conveyer belt with the pastry dough grain being substantially at right angles to the conveyer belt to enhance subsequent cutting operations.

Figure 1:
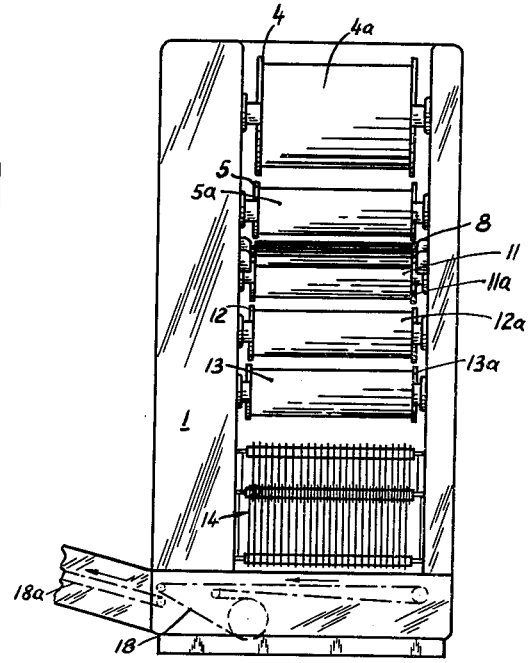
Figure 2:
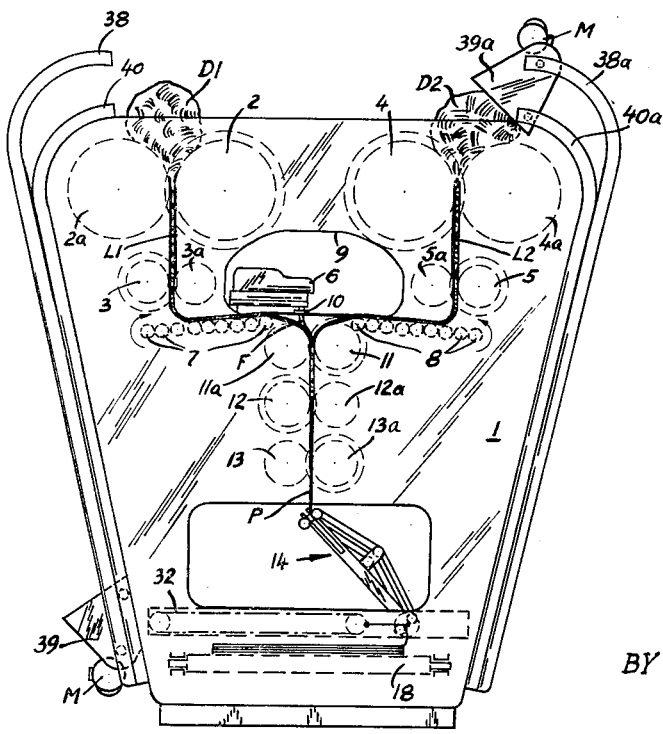

Other objects and features of the invention will become apparent and the invention will be best understood when the specification is read in conjunction with the accompanying drawings comprising FIGS. 1 to 6 in which:

FIGS. 1 and 2 show a front and side view respectively of one preferred embodiment of a pastry dough processing device of the invention;

FIGS. 3, 4, and 5 show various positions of the preferred embodiment of the multi-layer pastry product transferring apparatus; and FIG. 6 shows a top view of the conveyer belt of the preferred embodiment having the multi-layer pastry product positioned thereon by the transferring apparatus of FIGS. 3 to 5.

Referring now in particular to FIGS. 1 and 2, the inventive machine includes a housing 1 having an internal frame structure (not shown) for providing bearing supports for rotatably supporting a train of primary roller pairs 2, 2a and 3, 3a and a train of primary roller pairs 4, 4a and 5, 5a. These two trains of primary rollers are positioned adjacent to each other near the top sides of the machine and are suitably driven, as by a gear train or chain drive assembly powered from motor means (not shown), to force pastry dough in a downward direction. As best seen in FIG. 2, a train of horizontal transport rollers 7 has one end located below the primary roller pairs 3, 3a and the other end near the center of the machine. Similarly, another train of horizontal transport rollers 8 has one end located below the primary roller pairs 5, 5a and the other end near the center of the machine. The transport roller trains 7 and 8 are oppositely driven by suitable gear or chain drives, and are rotatably supported on bearing supports on the noted internal frame structure with suitable separation being provided between the two transport roller trains 7 and 8.

An aperture 9 is provided in housing 1 above the inner ends of the transport roller trains 7 and 8 for supplying filling device 6 with any desired type of filling. The filling device 6 contains a reservoir with power driven expulsion means (not shown) for ejecting a continuous flow of filling out of an outlet 10.

A train of three pairs of secondary rollers 11, 11a, 12, 12a and 13, 13a are located on the noted internal frame structure near the center of the machine and below the inner ends of the transport roller trains 7 and 8. These roller pairs are suitable driven by gear or chain drives to force pastry dough in a downward direction.

The spacing or gap between the rollers in each pair of primary rollers is predetermined according to requirements for required dough band thicknesses while the spacing or gap between the rollers in each pair of secondary rollers is adjusted to furnish the required thicknesses of the multi-layer pastry product being produced.

A reciprocating apparatus 14 is located below the noted train of secondary roller pairs and above a transport conveyer 18. Conveyer 18 extends across the width of the machine and conveys the pastry product from the reciprocating apparatus to a second conveyer 18a which further conveys the product to a cutter machine and oven (not shown). As will be described in detail in conjunction with FIGS. 3 to 5, reciprocating apparatus 14 has its input section positioned directly below the gap between roller pair 13, 13a and has its output section continuously movable from one side to the other of transport conveyer 18.

In operation, a mass of dough D1 is placed above primary roller pair 2, 2a and a separate mass of pastry dough D2 is placed above primary roller pairs 4, 4a. These two roller pairs, in conjunction with their associated roller pairs located therebelow roll or form the pastry dough into two thin bands or layers L1 and L2. These layers pass to the transport rollers 7 and 8 and are carried to the common point between roller pair 11, 11a. At this common point, filling device 6 ejects a flow of filling F out of outlet 10 onto one layer or the other, or at this junction point. The position of device 6 being adjustable as desired. The train of secondary roller pairs compresses layers L1 and L2 together with the filling F therebetween, thereby producing a three-layer pastry product P. The reciprocating apparatus places product P on transport conveyer 18 in the configuration shown in FIG. 6. This configuration is controlled according to the speeds of the apparatus 14 and the conveyer 18. Product P then passes onto conveyer 18a as noted.

Referring now to FIGS. 3 to 5 of the drawings, the operation of the reciprocating apparatus will be described.

Reciprocating apparatus 14 comprises a wheel 33 arranged to move longitudinally in two directions within a guiding channel secured to the internal frame structure and positioned above conveyer 18. The internal frame structure includes a pivot point 15 located directly below the gap between roller pair 13, 13a. A pair of guide bars 30 are pivotedly secured at one end to the axis of wheel 33 and slideably connected to pivot point 15 by forks 31 on their other end. As wheel 33 moves in its noted defined channel, bars 30 move through the various positions such as shown in FIGS. 3 to 5, the forks 31 sliding along pivot point 15.

A pair of linking bars 26 are pivoted at pivot point 15 and a corresponding pair of linking bars 26b are pivoted on wheel 33. Rollers 21 and 21a are rotatably supported by linking bars 26 and rollers 24 and 24a are rotatably supported by linking bars 26b. A pair of linking bars 26a and rollers 22 and 22a are located between pivot point 15 and wheel 33 and are held in position by arms 23, 23a extending between rollers 21a, 22a and 24a and by arms 25, 25a extending between rollers 21, 22 and 24.

A series of endless belts 16, 16a, 20 and 20a are positioned on rollers 21, 21a, 22, 22a, 24 and 24a and define a fixed gap for the passage of pastry product P therethrough.

Roller 13, through suitable drive means 27 imparts rotation to roller 41 which carries an endless belt 32 passing over an idler roller 41a. A connecting rod 28 connects the axle 29 of wheel 33 to a fixed point on belt 32, thereby moving wheel 33 along its defined channel in a reciprocating motion. As wheel 33 moves, the belt assembly 16, 16a, 20 and 20a pivots about rollers 22 and 22a as guide bars 30 slide along pivot point 15. When wheel 33 is in its extreme left-hand position as shown in FIG. 3, wheel 33 is to the left of the center of linking bar 26a, and the center of linking bar 26a is to the left of the pivot point 15. At this time, the pastry product P is resting on belts 20a and 16a which continually move product P toward conveyor 18.

When wheel 33 advances to the right in excess of one-fourth of the length of its guiding channel, it is positioned to the right of the center of linking bar 26a, but bar 26a is still to the left of pivot 15. At this time, the pastry product rests on belt 20a but the advanced portion of pastry P transfers by gravity from belt 16a to belt 16.

When wheel 33 advances approximately three-quarters of the distance from its extreme left-hand position to its right-hand position, the center of linking bar 26a moves to the right of pivot 15 and wheel 33 continues to be located to the right of bar 26a. At this time, the pastry product is transferred by gravity from belt 20a to belt 20 and continues on belt 16 to conveyor 18. The pastry product remains on belts 20 and 16 while wheel 33 moves to its extreme right-hand position and then back approximately one-fourth of the length of the guiding channel. From this point until after three-quarters of the length of the guiding channel has been traversed during the return movement, belts 20a and 16 convey the product P. At this time, product U transfers from belt 16 to 16a and from this point until the return movement is completed and after one-fourth of the next cycle is completed, belts 20a and 16a convey the pastry product P. The above described sequence of product conveyance by belts 20, 20a, 16 and 16a is continually repeated. Thus, product P passing from rollers 13 and 13a is evenly distributed, in a reciprocal manner, across conveyer 18 by the noted belt assembly.

Referring again to FIG. 2 of the drawings, reciprocating apparatus 14 and conveyer 18 are readily accessible for any manual operation necessary on product P.

Two pairs of elevator guides 38, 40 and 38a and 40a are provided for conveying respective buckets 39 and 39a from the base of the machine to the top thereof to convey pastry dough to the input of roller pairs 2, 2a and 4, 4a. These elevator guides are so positioned that the buckets are automatically emptied when they reach the noted roller pair inputs. More specifically, the buckets 39 and 39a each include a lower driving wheel or gear powered by motor M and arranged to engage the sides of channel 38 or 38a to drive the buckets upward and downwardly through operator control apparatus (not shown). The apparatus for controlling the motors can be of the type used for controlling cranes used in steel warehouses, for example, with button controls for starting, stopping and reversing the motor connetced thereto by flexible cables. A freely rotating upper guide or wheel is provided on each bucket and arranged to move within their respective elevator guides 40 and 40a. These elevator guides are so arranged with respect to each other that at the top of the apparatus they cause the position of the buckets to change and empty the contents. In greater detail, the bottoms of the buckets 39, 39a are coupled through guide wheels to channels 38, 38a respectively. The tops of the buckets are coupled through the upper guide wheels to guides 40, 40a respectively. As best seen in FIG. 2, the channels 38, 38a are above guides 40, 40a of the top of the pastry dough processing device. Thus, the buckets are inverted when they are driven to the top of the processing device by motor M.

If desired, reciprocating apparatus 14 can be maintained in any desired fixed position with respect to conveyer 18 by maintaining the driving belt immobile.

While the principles of the invention have been described above in connection with specific apparatus and applications, it is to be understood that this description is made only by way of example and not as a limitation on the scope of the invention.

I claim:

1. An automatic pastry dough processing device comprising a pair of first means for forming first and second continuous strips of dough from masses of dough, a pair of transport means associated with respective ones of said first means for positioning said two strips into alignment with each other, means for inserting a layer of filling material between said aligned strips, means for compressing said strips and said material into a single continuous pastry product, conveying means for receiving and continuously transporting said pastry product, and reciprocating means for distributing said continuous pastry product transversely on said conveying means, the said reciprocating means including a fixed pivot point, a first section pivotably secured to said pivot point, a second section pivotably secured to said first section, and means pivotably secured to said second section and movable in a plane parallel to said pastry product conveying means.

2. A pastry dough processing device as set forth in claim 1 wherein said first section includes a set of conveying means positioned adjacent said compressing means and wherein said second section includes a set of conveying means positioned adjacent said pastry product conveying means, the first and second section conveying means being positioned in conveying relationship with each other.

3. A pastry dough processing device as set forth in claim 1 wherein said means movable in a plane parallel to the pastry product conveying means comprises an endless belt having a connecting rod secured at one end to a point on said endless belt and having the other end connected to the said second section of said reciprocating means.

4. A pastry dough processing device as set forth in claim 1 wherein each of said sections comprises a set of conveying means fixedly spaced apart for the passage and conveyance of pastry products therethrough.

References Cited by the Examiner

UNITED STATES PATENTS

| | | | |
|---|---|---|---|
| 518,454 | 4/94 | Holmes | 107—1.8 |
| 1,720,990 | 7/29 | Aeschbach | 107—7 |
| 2,130,097 | 9/38 | Loose et al. | 107—1.8 |
| 2,264,115 | 11/41 | Granger et al. | 107—1.8 X |
| 2,627,822 | 2/53 | Hubbard | 107—1.8 |
| 3,001,486 | 9/61 | Duncan et al. | 107—40 |

WALTER A. SCHEEL, *Primary Examiner.*

CHARLES A. WILLMUTH, ROBERT E. PULFREY,
*Examiners.*